United States Patent
Barnett et al.

(10) Patent No.: US 8,337,059 B2
(45) Date of Patent: Dec. 25, 2012

(54) CONTROL-SURFACE-MOUNTED LANDING AND TAXI LIGHTS

(75) Inventors: David Barnett, Urbana, OH (US); Jeffrey M. Singer, Springfield, OH (US); Timothy C. Martin, Urbana, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/090,013

(22) Filed: Apr. 19, 2011

(65) Prior Publication Data

US 2012/0268959 A1 Oct. 25, 2012

(51) Int. Cl.
*F21V 33/00* (2006.01)
(52) U.S. Cl. .......... 362/470; 362/523; 362/545
(58) Field of Classification Search .......... 362/470, 362/523, 524, 532, 543, 544, 545
See application file for complete search history.

(56) References Cited

U.S. PATENT DOCUMENTS

| | | | | |
|---|---|---|---|---|
| 3,270,193 | A * | 8/1966 | Peterson | 362/470 |
| 7,040,786 | B2 * | 5/2006 | Ganzer et al. | 362/470 |
| 7,210,828 | B2 * | 5/2007 | Fukawa et | 362/465 |
| 7,645,053 | B2 * | 1/2010 | Machi et al. | 362/241 |
| 2003/0174504 | A1 * | 9/2003 | Tamaoki | 362/470 |
| 2008/0266890 | A1 * | 10/2008 | Mochizuki et al. | 362/524 |
| 2010/0046241 | A1 * | 2/2010 | Lundberg et al. | 362/470 |

* cited by examiner

*Primary Examiner* — Laura Tso
(74) *Attorney, Agent, or Firm* — Lowe Graham Jones PLLC

(57) ABSTRACT

A lighting assembly for movable control surfaces of a vehicle. The light assembly includes a lens, a plurality of light-emitting diodes (LEDs) and a housing that receives the plurality of LEDs and the lens. The housing of the light assembly is received within the movable control surface, such that the lens is flush with a surface of the movable control surface. The light assembly includes a plurality of reflectors. The plurality of LEDs is rotatably mounted within the housing. The light assembly includes a controller that controls the position of the LEDs relative to the housing, based on a received control signal.

11 Claims, 4 Drawing Sheets

US 8,337,059 B2

CONTROL-SURFACE-MOUNTED LANDING AND TAXI LIGHTS

BACKGROUND OF THE INVENTION

Forward-facing aircraft floodlight placement is currently limited to small areas of fixed structure, landing gear, landing gear doors, or extendable lights—see FIGS. 1 and 2. Traditional floodlights are incandescent or halogen, parabolic aluminized reflector (PAR) lamps.

Recently, high-intensity discharge (HID) lamps have been substituted for traditional PAR-46- and PAR-64-sized lamps. While the HID lamps are somewhat smaller for a given output, than the older PAR lamps, the packaging requirements are similar and have required placement within the traditional aircraft locations.

Traditional aircraft locations for forward lighting represent several engineering challenges. Any equipment mounted on the landing gear is subject to damage and wear from airflow, driven water, fluid leakage, shock loads, vibration, and mechanical stress from failing components or ground equipment contact. Placing extendable or gear-mounted lighting in the airstream increases aerodynamic drag. During the landing phase of flight, aerodynamic drag within reason is not a significant problem. However, any extra drag after take-off, while climbing out, is harmful.

Landing lights are used for added conspicuity whenever the aircraft is below a defined altitude. This is true both out-bound and inbound, as well as in an orbiting pattern. This defined altitude ranges from 18,000 to 10,000, feet based on local requirements. In many cases an aircraft is operating below the altitude that requires switching on a landing light yet prior to lowering the landing gear. Lights mounted in the wing root/strakelet area or retractable lights are normally used before the landing gear is lowered.

SUMMARY OF THE INVENTION

The present invention provides an array of solid-state light-emitting diodes (LEDs) in the moving control surface mounted on the leading edge of the wing. This arrangement is applicable to slat-style control surfaces, in particular, yet is possible for any surface with an in-use orientation suitable for the required light distribution.

An array of LEDs, numbering as required to produce the required light intensity, is fitted to one or more areas of a wing's forward control surface. The light intensity is limited only by the surface area devoted to the array. In a practical case, the protective lens and thermal management solution limit the array size by the resultant weight of the assembly. Because of the erosion effects of high-speed airflow, forward-facing lenses are typically glass. The rather high density of glass makes the lens a significant portion of the light assembly's weight. The current state-of-the-art LED products are a balance between how hard the devices are driven and the thermal efficiency. LEDs are more efficient as the drive current drops. There is a best-case point at which the light output and the thermal losses with the resultant heat dissipation features are reached. In a prototype design, the light assembly is fitted to the inboard slat only. This inner slat is constructed of aluminum materials or a thermally conductive composite material to allow the aircraft structure to buffer the temperature rise in the LEDs and dissipate the heat into the air flowing over the wing. The remainder of the wing surfaces are unaffected and can be constructed of metallic or nonthermally conductive composite material, as desired by the airframe designer.

Adding the light assembly's weight to the slat assembly typically does not require changes to the control surface mechanical systems. The added weight of the light assembly is typically insignificant in relationship to the forces applied from airflow at a typical maximum 250 knots airspeed for deployment.

BRIEF DESCRIPTION OF THE DRAWINGS

Preferred and alternative embodiments of the present invention are described in detail below, with reference to the following drawings.

DETAILED DESCRIPTION OF THE INVENTION

Figure 1:
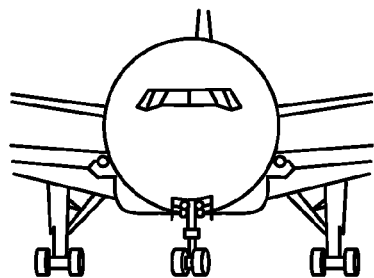
FIGS. 1 and 2 illustrate landing and taxi lights mounted on aircraft in accordance with the prior art.
Figure 2:
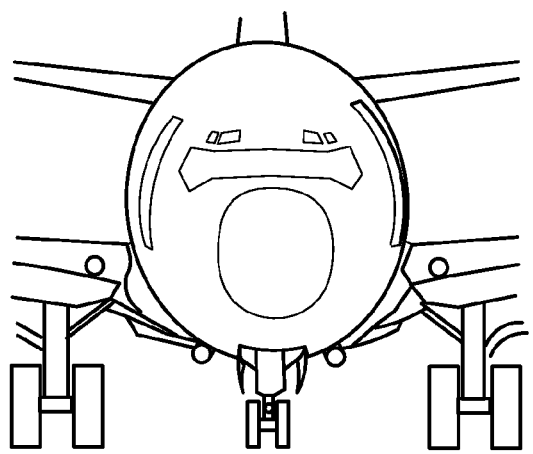
Figure 3:
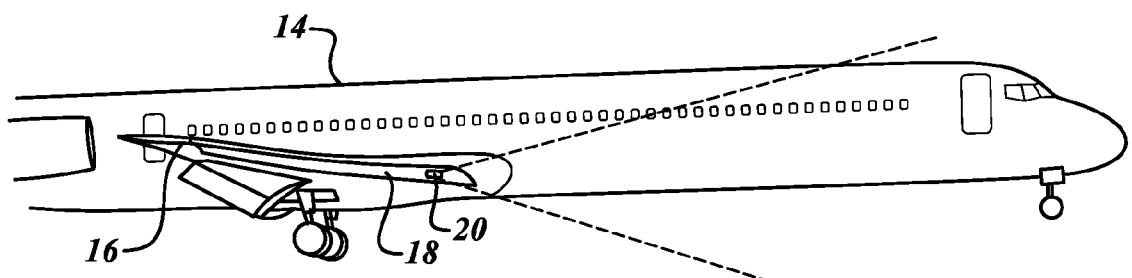
FIG. 3 illustrates a side view of an aircraft having a movable control surface formed in accordance with an embodiment of the present invention.

As shown in FIG. 3, an aircraft 14 is shown in a landing-mode configuration with gear down and flaps and slats 18 deployed on a wing 16. One or more light-emitting diode (LED) light assemblies are embedded into a movable control surface. The slat 18 is the movable control surface in this example. In this exemplary aircraft 14 the slat 18 is a full leading-edge slat. The slat 18 includes one or more light-emitting diode (LED) light assemblies 20. The light assemblies 20 that are included within the slat 18 are a fixed-mounted assembly, which casts light only in a set angular pattern from the slat 18, and/or are a variable-pitch light assembly that can rotate the outputted spectrum of light from the slat 18.

The fixed light assembly is preferably one that would be used in a slat that does not rotate between a stowed and a deployed position. In other words, as the slat deploys, the slat does not rotate greater than a threshold amount relative to the wing. The variable-pitch LED light assembly is used in a slat that does rotate when deployed. In another embodiment, the variable-pitch LED light assembly is used if one desires manual or automatic control of direction of the light produced by the light assembly from the slat, regardless of slat or wing orientation.

Figure 4:
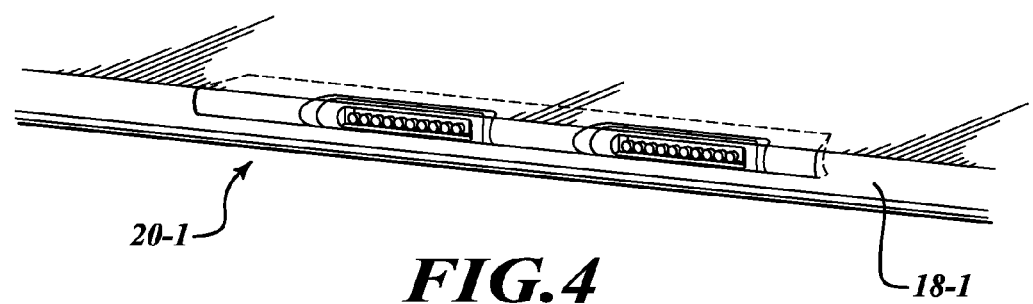
FIG. 4 illustrates a perspective view of a movable control surface formed in accordance with an embodiment of the present invention.

FIG. 4 illustrates a perspective view of a slat 18-1 with two light assemblies 20-1 mounted therein. The surface of the light assemblies 20-1 is mounted flush with the surface of the slat 18-1. The depth the light assemblies 20-1 is not large enough to conflict with the traditional slat hardware used for stowing and deploying the slat 18-1.

Figure 5:
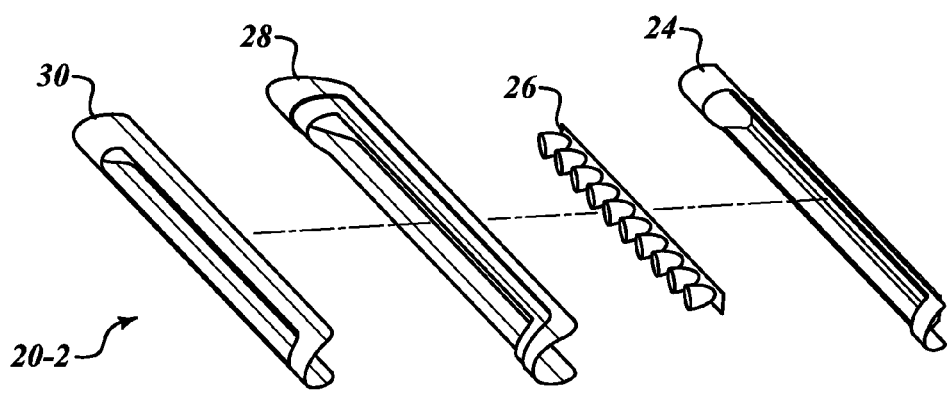
FIG. 5 illustrates an exploded view of a lighting assembly for mounting within a movable control surface.

FIG. 5 a fixed light assembly 20-2 that includes an LED enclosure 24, an LED strip 26, a housing 28, and a lens assembly 30. The LED strip 26 mounts within the LED enclosure 24. The LED enclosure 24 and the lens assembly 30 mount to the housing 28. The housing 28 is secured within a movable control surface such that the lens assembly 30 is flush with the surface of the movable control surface. Traditional fasteners and epoxies are used for attaching the components of the fixed light assembly 20-2 and for attaching the fixed light assembly 20-2 to the movable control surface.

Figure 6:
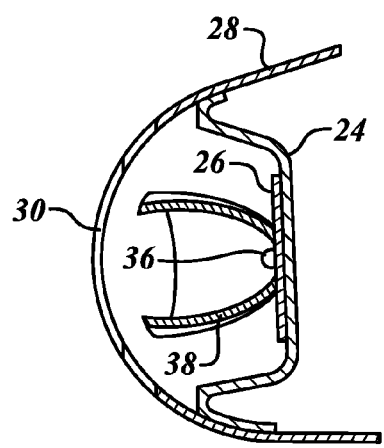
FIG. 6 illustrates a cross-sectional view of the lighting assembly shown in FIG. 5.

FIG. 6 illustrates a cross-sectional side view of the light assembly 20-2 of FIG. 5. The LED strip 26 mounts to the LED enclosure 24. The LED strip 26 and/or the LED enclosure 24 includes electrical traces for electrically connecting LEDs 36 that are mounted on the LED strip 26 to externally attached cables. Surrounding one or more of the LEDs 36 on the LED strip 26 are reflectors 38. The reflectors 38 are formed of or include a highly reflective material on at least the inner walls of the reflector 38. The LED enclosure 24 then mounts to the housing 28. The housing 28 receives the lens assembly 30, such that a seal exists between the lens assembly 30 and the housing 28.

Figure 7:
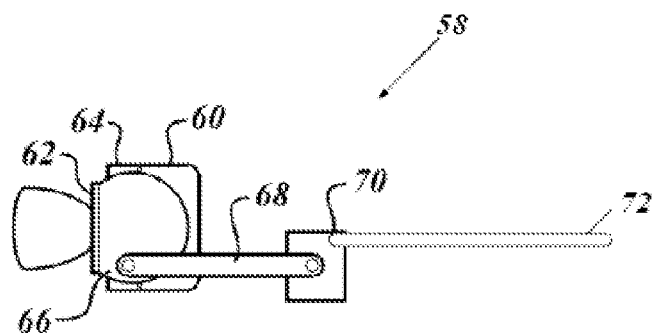
FIG. 7 illustrates a light system formed in accordance with an embodiment of the present invention.

FIG. 7 illustrates a side view of a light 58 that has the ability to rotate relative to the control surface on which it is mounted. The light 58 includes a rotary mount base 60 that is fixedly attached to the control surface. The light 58 also includes a light strip 62 that includes a plurality of LEDs (or comparable light sources) and reflectors mounted on one side. The light strip 62 is mounted to a rotary housing 66, which is secured within the rotary mount base 60 by a retainer block 64. A mechanical linkage 68 is attached at one end to the rotary housing 66 and at another end to a gear assembly 70 which attaches to a slat extension linkage (e.g., guide rods, struts, cams or similar components) 72. The aiming direction of the light is a function of the position of the slat with the aim fixed in relationship to the attachment orientation at the stage of deployment or retraction of the slat.

Figure 8:
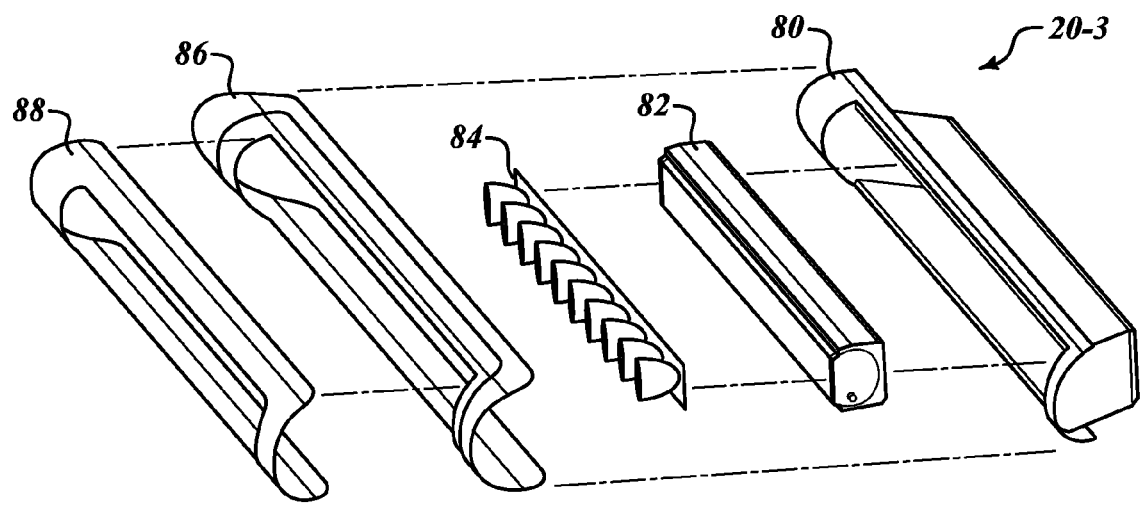
FIG. 8 illustrates an exploded view of the light assembly shown in FIG. 7.

FIG. 8 a rotating light assembly 20-3 (such as that used in FIG. 7) that includes an LED enclosure 80, a rotating assembly 82, an LED strip 84, a housing 86, and a lens assembly 88. The LED strip 84 mounts to the rotating assembly 82 and the rotating assembly 82 mounts within the LED enclosure 80. The LED enclosure 80 and the lens assembly 88 mount to the housing 86. The housing 86 is secured within a movable control surface such that the lens assembly 88 is flush with the surface of the movable control surface. Traditional fasteners and epoxies are used for attaching the components of the fixed light assembly 20-3 and for attaching the fixed light assembly 20-3 to the movable control surface.

In another embodiment, the aim of the light produced by the light system is independent of the position of the respective control surface or aircraft attitude. A rotary light base is coupled to a drive motor or positioner that moves to generate a desired aim for the flight phase. The aim can be determined by local control (e.g., firmware or attitude sensor) or incorporated into a flight management system (FMS) that responds to automated take-off and landing sequence of events. In this embodiment, a processor provides a position signal to a motor based on a control signal received at the processor. The control signal may be one generated at a cockpit user interface device (i.e., a light position controller) or includes information related to flight of the aircraft, position of the slat in which the rotatable light assembly is mounted, and/or angle of attack of the aircraft. The processor executes logic, stored in local memory, for interpreting the received control signal and generating the position signal accordingly. For example, if the processor first receives a 2° nose-up angle-of attack value, the position signal generated by the processor is a −2° nose-down value. Then, when the aircraft transitions to the landing configuration and the angle-of-attack value goes to 8° nose up, the position signal generated by the processor is an −8° nose-down value, thus compensating for the rotation of the aircraft. Of course, the processor can compensate for other factors in order to keep the pattern of light generated by the LEDs at an optimum location. The motor used in this embodiment may be a direct drive stepper motor, a gear driven stepper motor if rotation torque is high enough to necessitate the weight of a gear case, or a servo-drive and encoder. The servo-drive and encoder would be more likely used in an analog control system with an attitude target rather than a FMS controlled system.

In one embodiment where multiple installations of light assemblies are included on a slat section, a common positioner with connecting linkage or independent positioners is used. Independent positioners that are in signal communication with a flight management system (FMS) may be used thus allowing the FMS to increase the vertical light pattern for a portion of the flight profile.

In one embodiment, one array of light assemblies in a slat is aimed a few degrees higher or lower than another array of light assemblies in the same slat. This reduces the peak intensity but increases the vertical pattern. This might be beneficial during a flare to touchdown without requiring dynamic aim control from the FMS. This dynamic aiming allows maximum intensity at a defined location in relationship to a flight deck.

Figure 9:
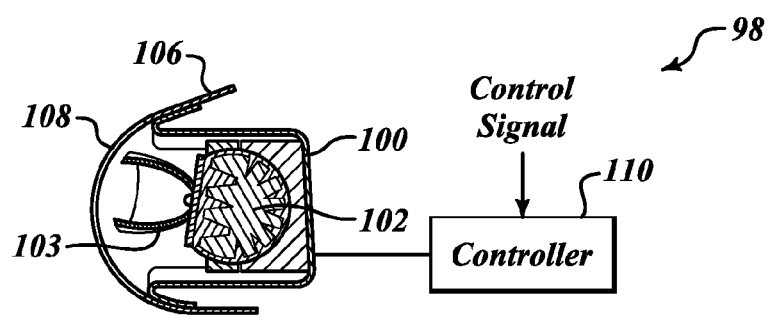
FIG. 9 illustrates a light system formed in accordance with an embodiment of the present invention.

FIG. 9 illustrates a rotating light system 98. The rotating light system 98 includes an LED enclosure 100 that is configured to receive a rotary actuator 102. Mounted to the rotary actuator 102 is an LED strip 103 that includes a plurality of LEDs and associated reflectors. The LED enclosure 100 is then received by a housing 106 with a lens assembly 108 mounted thereto. The rotary actuator 102 is shown in a slightly pitched-up attitude. A controller 110 is attached to the rotary actuator 102. The controller 110 receives input signals comparable to those received by the processor 72, described above with regard to FIG. 7. The controller 110 responds similarly to the rotary actuator 102, except that the output signal produced by the controller 110 is conducive for the rotary actuator 102, versus the motor 70.

The internal structure shown in the rotary actuator 102 is part of a thermal management system. A rotary tube is filled with an organic phase change material (PCM) to store the thermal energy during operation. Internal fins are used to conduct heat into the poor thermally conductive PCM.

Figure 10:
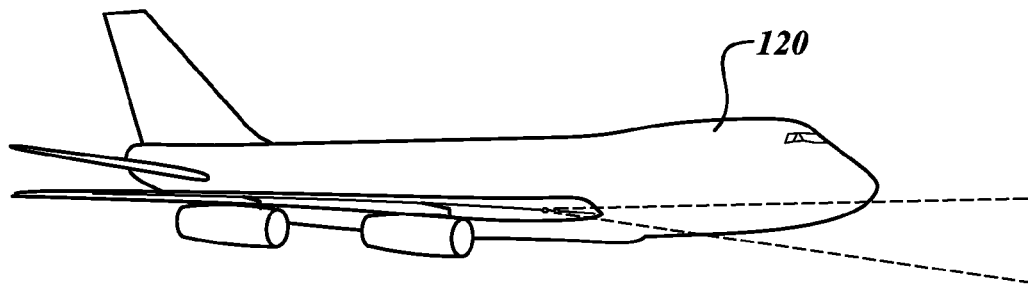
FIG. 10 illustrates a perspective view of an aircraft in a cruise mode of flight.

FIG. 10 illustrates a large cargo aircraft 120 in a cruise mode of flight below a certain altitude that requires the aircraft 120 to be illuminating landing lights. The aircraft 120 includes one or more LED light assemblies included within one or more of the leading-edge slats. The illumination pattern produced by the LED light assembly in the slats, when the aircraft is in the clean cruise mode of flight, is at a first range, as shown by the dashed lines extending from the leading edge of the wing of the aircraft 120.

Figure 11:
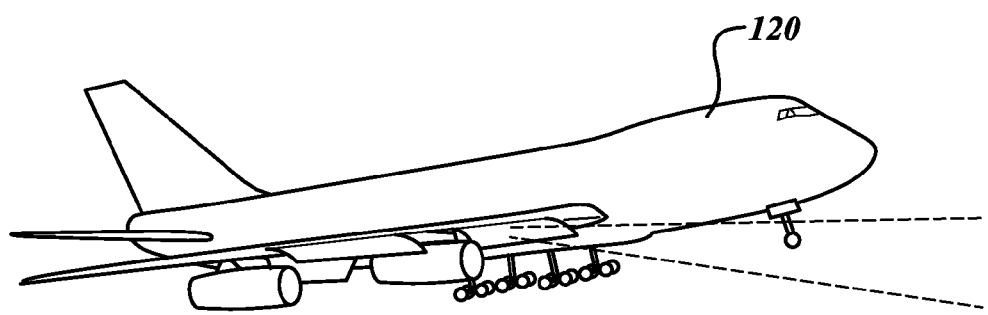
FIG. 11 illustrates an aircraft in a landing mode of flight.

FIG. 11 shows the aircraft 120 in a landing mode of flight with the gear down and slats deployed. In order for the light illuminated by the light assembly to maintain a proper angle as the slat is deployed, then the light assembly included within the slat is rotated in order to maintain the desired illumination pattern. In other words, if a rotatably mounted slat LED assembly is provided, then nearly any desirable lower and upper angle-of-attack value for the illumination can be obtained.

It can also be appreciated that a fixed-mounted LED assembly may be used in one or more of the slats of the aircraft 120.

In another embodiment, multiple LED assemblies are located on one or more slats on a wing.

While the preferred embodiment of the invention has been illustrated and described, as noted above, many changes can be made without departing from the spirit and scope of the invention. For example, The LED light assemblies may be included in other movable control surfaces, such as the flaps, canards, etc. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A movable control surface device for a vehicle, the device having a control surface portion and a mechanical component for allowing the control surface portion to move relative to a part of the vehicle, the device comprising:
   a light assembly comprising:
      a lens;
      a plurality of light-emitting diodes (LEDs); and
      a housing configured to receive the plurality of LEDs and the lens,
      wherein the housing of the light assembly is received within the control surface portion, such that the lens is flush with a surface of the control surface portion.

2. The device of claim 1, wherein the light assembly further comprises a plurality of reflectors.

3. The device of claim 1, wherein the plurality of LEDs are rotatably mounted within the housing.

4. The device of claim 3, wherein the light assembly further comprises a control device configured to control position of the LEDs relative to the housing based on a position of the control surface portion.

5. The device of claim 3, wherein the light assembly further comprises a controller configured to control position of the LEDs relative to the housing based on a received control signal.

6. The device of claim 5, wherein the control signal comprises at least one of position of the control surface portion, angle-of-attack of the vehicle, or phase-of-operation of the vehicle.

7. The device of claim 5, wherein the vehicle is an aircraft and the control surface portion is a leading-edge wing slat.

8. The device of claim 7, further comprising a second light assembly mounted within the control surface comprising:
   a lens;
   a plurality of LEDs, wherein the plurality of LEDs are rotatably mounted within the housing; and
   a housing configured to receive the plurality of LEDs and the lens,
   wherein the housing of the light assembly is received within the control surface portion, such that the lens is flush with a surface of the control surface portion.

9. The device of claim 8, further comprising a first positioning device coupled to the first light assembly and second positioning device coupled to the second light assembly, wherein the first positioning device positions the first light assembly to produce a bandwidth of light having a first angular center, wherein the second positioning device positions the second light assembly to produce a bandwidth of light having a second angular center, the first and second angular centers having different values.

10. A method comprising:
    at a controller located within an aircraft,
       receiving a control signal, wherein the control signal comprises at least one of position of a control surface portion, angle-of-attack of the aircraft, or phase-of-operation of the aircraft; and
       generating a position signal based on the received control signal; and
    at a light assembly located within a control surface on the aircraft, moving a plurality of light-emitting diodes (LEDs), based on the generated position signal.

11. The method of claim 10, wherein the control surface portion is a leading-edge wing slat.

* * * * *